United States Patent [19]

Schwanda

[11] Patent Number: 4,937,486
[45] Date of Patent: Jun. 26, 1990

[54] LAMINATED POLE

[75] Inventor: Josef Schwanda, Lupfig, Switzerland

[73] Assignee: Asea Brown Boveri, Ltd., Baden, Switzerland

[21] Appl. No.: 333,087

[22] Filed: Apr. 4, 1989

[30] Foreign Application Priority Data

Apr. 26, 1988 [CH] Switzerland .......................... 1557/88

[51] Int. Cl.[5] .............................................. H02K 1/24
[52] U.S. Cl. .................................... 310/269; 310/197; 310/217; 310/218
[58] Field of Search ............... 310/269, 216, 217, 218, 310/270, 182, 197, 270, 42, 91, 183, 51, 211

[56] References Cited

U.S. PATENT DOCUMENTS

| 630,409 | 8/1899 | Reist | 310/269 |
|---|---|---|---|
| 1,267,993 | 5/1918 | Eaton | 310/218 |
| 1,695,391 | 12/1928 | Schou | |
| 1,828,578 | 10/1931 | Riggs | |
| 4,316,111 | 2/1982 | Merki | 310/218 |

FOREIGN PATENT DOCUMENTS

| 0022995 | 1/1981 | European Pat. Off. | 310/211 |
|---|---|---|---|
| 859504 | 10/1952 | Fed. Rep. of Germany | |
| 1070284 | 12/1959 | Fed. Rep. of Germany | |
| 1071827 | 12/1959 | Fed. Rep. of Germany | 310/211 |
| 2444360 | 7/1980 | France | |
| 0114154 | 9/1980 | Japan | 310/269 |
| 0069445 | 4/1983 | Japan | 310/269 |
| 632877 | 10/1982 | Switzerland | |
| 0444297 | 9/1975 | U.S.S.R. | 310/211 |
| 1013650 | 12/1965 | United Kingdom | 310/269 |

OTHER PUBLICATIONS

"Synchronous Machines for Hydroelectric Power Plants", CH-T 130 082 D from 1977 of BBC Aktiengesellschaft Brown Boveri and Cie, Baden/Schweiz, particularly p. 32.

*Primary Examiner*—R. Skuddy
*Attorney, Agent, or Firm*—Oblon, Spivak, McClelland, Maier & Neustadt

[57] ABSTRACT

In an end-plate-less formed pole (1) for electric machines with salient poles, combined clamping and support elements (26, 27) which are used both for clamping together the single laminations (2) and for supporting the pole coils (41) are provided in the area close to the axis, in addition to the conventional clamping elements (8, 10). In addition, these elements are used for anchoring the damper plates (44, 45) and flexible link pieces (46) of the damper rods (43).

2 Claims, 1 Drawing Sheet

LAMINATED POLE

BACKGROUND OF THE INVENTION

1. Field of the Invention

The invention relates to a laminated pole for an electric machine having salient poles, the pole being clamped by clamping means, which clamping means comprise through bolts in the section of the pole close to the axis and flange-like pressure distribution elements at the end.

A laminated pole having these features is known, for example, from Swiss Patent Specification 632,877 and U.S. Patent Specification 4,316,111.

2. Discussion of Background

Rotor poles of electric machines with salient poles have been constructed to be solid or laminated (stacked pole) depending on the electric or mechanical loading. Solid poles of forged steel or steel casting exhibit higher stray losses due to the relatively low ohmic resistance. Stray losses in this case essentially means the eddy current losses caused by the higher field harmonics caused by the armature current, and the pulsation losses caused by the main field due to the slotting. Solid poles act like conductor rods of a cage armature winding so that large currents can flow in them with asynchronous operating conditions.

Due to the capability of carrying large currents and the high energy dissipation capacity, the solid pole is particularly suitable for asynchronous starting of large synchronous motor generators.

Laminated poles have a high ohmic resistance in the longitudinal direction, the stray losses are correspondingly lower but so is their damping effect. The stacked pole is therefore provided with a damper winding to obtain the required operational stability. Stamped single laminations of a thickness of about 1 mm are used for producing stacked poles. The laminations are stacked over a mandril in a press. After the high axial compression pressure has been reached, the mandril is welded to solid pole end plates at both end faces. The high pressure per unit area and additional welds at the outer contours result in a mechanically compact body which does not have to be subjected to any further machining since the construction of the support claws, venting slots, support noses for the pole winding and so forth is contained in the stamping and stacking operations (in-house publication "Synchronous machines for hydro-electric power plants" CH-T 130 082 D from 1977 of BBC Aktiengesellschaft Brown Boveri and Cie, Baden/Schweiz, particularly page 32).

The pole end plates made of solid steel require a comparatively elaborate production method for slow-running synchronous machines and for switchable-pole machines, particularly for hydroelectric generators having high numbers of poles. In addition, they impair the effects on the operating characteristics of the machine resulting from the lamination of the pole body and indicated above.

The laminated pole according to Swiss Patent Specification 632,877 avoids the above inadequacies by laminating and welding-together of the pole end plates. This reduces the production expenditure by about 40 to 50 % of that when solid pole end plates are used. A further advantage consists in that the pole end plate has a lighter weight since the fill factor is $\leq 98$ % due to the lamination. This weight saving is accompanied by a reduction in the loading on the pole anchorages. In addition, the pulsation losses of the end plate laminated in accordance with the invention are lower than those of a solid construction.

The pole plates exhibit a thickness of between 40 and 60 mm, depending on the axial length of the pole body, and are built up out of single laminations with a thickness of up to 3 mm and are welded to one another at several points at least at the outer contour. The lamination thickness corresponds to that of the pole laminations of the pole body. They have the same outer contours as the pole laminations of the pole body and can thus be processed with one and the same stamping tool.

Apart from through holes for clamping the entire pole, the laminations of the pole end plates exhibit one or more recesses which are flush with one another and through which bolts of appropriate cross-section are pushed which, in turn, are welded to the single laminations at the two end faces of the pole end plate. They are used as end supports for the pole coils.

On the basis of the prior art, the present invention is based on the object of creating a laminated pole of the type initially mentioned, which exhibits all advantages of the known pole and furthermore can also be produced more economically and simply.

SUMMARY OF THE INVENTION

According to the invention, this object is achieved in that, in the section of the pole remote from the axis, further clamping bolts passing through the entire pole are provided with end-side clamping and pressure distribution elements with projections pointing outward for supporting the pole coils.

In such a construction of the pole, it is no longer necessary to weld the end plates, neither do any additional support elements have to be attached for the pole coils. In addition, the projections are highly suitable for attaching the damper plates and the laminated links.

Further details of the invention are obtained from the following description of an illustrative embodiment shown in the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
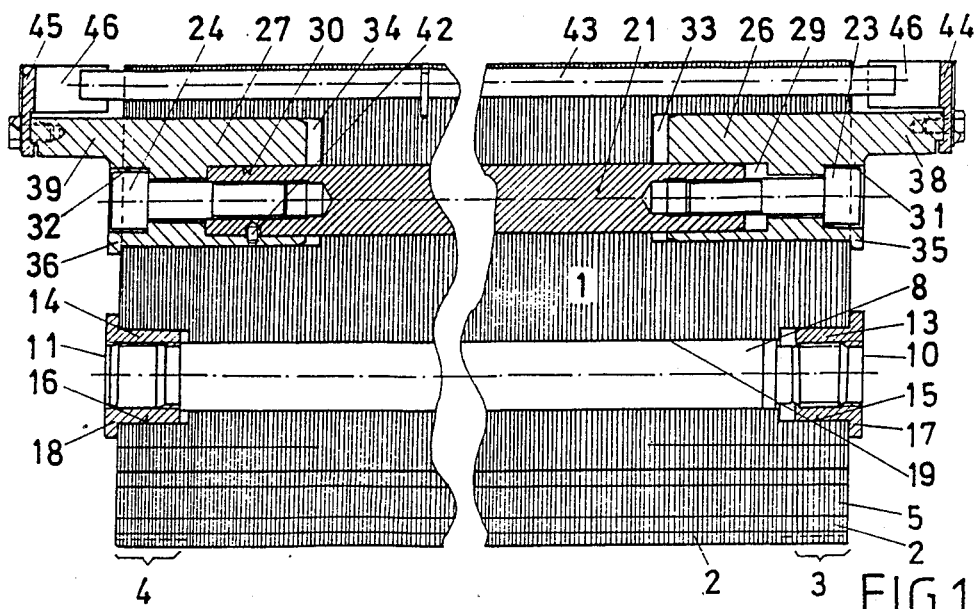
FIG. 1 shows a longitudinal section through the pole of an electric machine.
Figure 2:
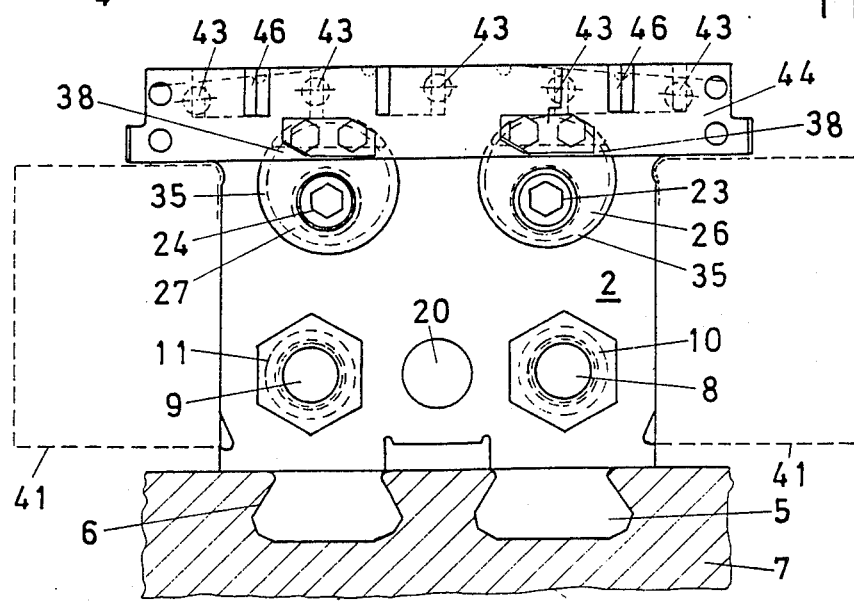
FIG. 2 shows a view of the front face of the pole according to FIG. 1.

Referring now to the drawings, wherein like reference numerals designate identical or corresponding parts throughout the several views, the pole 1 according to FIG. 1 is constructed in familiar manner of single laminations 2 the contour of which can be seen in FIG. 2. The end area 3, 4 indicated by the wavy brackets is also built up out of single laminations 2 and forms pole end plates with respect to its function.

At the radially inner end of the pole, dovetail-shaped pole claws 5, arranged in pairs, are provided integrally with the single laminations 2 which are wedged into corresponding dovetail-shaped slots 6 in the rotor ring 7 in the case of the example.

The pole 1 is pressed together by means of two clamping bolts 8, 9, arranged symmetrically with respect to the center axis, and associated clamping nuts 10, 11 in the section close to the axis. Each clamping nut exhibits a cylindrical fit cylinder 13, 14 which is provided with an internal thread and which is completely located inside a hole 15, 16 of corresponding diameter in the end area 3 and 4, respectively, of the pole. On the outside, the fit cylinders 13, 14 change to a flange-like extension 17, 18 with hexagonal outside contour which acts as pressure distribution element.

The diameter of the hole 19 which completely passes through the pole in the longitudinal direction is of the same size as the outside diameter of the clamping bolts 8 and 9. A further longitudinal hole 20 in the pole is used, in conjunction with a threaded bolt (not shown), for attaching the pole coil 41 to the front face (not numbered in the drawings).

The clamping of the pole in the area remote from the axis essentially differs from that in the area close to the axis due to the special construction of the pressure distribution elements. Two clamping bolts 21 (only one of which is visible in FIG. 1) are there provided with inside threads at both ends. Combined clamping and support elements 26, 27 having an essentially cylindrical outside contour are screwed to the clamping bolts 21 by means of hexagonal socket-head screws 23, 24 on both sides.

The combined clamping and support element exhibits at its inner end an eccentric hole 29 and 30 into which the ends of the clamping bolts 21 plunge. Coaxially to this hole, a further hole 31 and 32, respectively, is provided from the outside for accommodating the screw head of the screws 23, 24.

The cylindrical of the elements 26, 27 is located completely inside blind 33, 34 in the section of the pole remote from the axis. An encircling collar 35, 36 is used as clamping surface. Each clamping and support element exhibits a cylinder-section-shaped projection 38, 39 which is constructed integrally with the element. These projections are used for the radial support of the pole coil 41 (indicated diagrammatically in FIG. 2).

For the sake of completeness, an anti-rotation element in the form of a pin 42 for the clamping bolts 21 is also drawn in FIG. 1.

Figure 3:
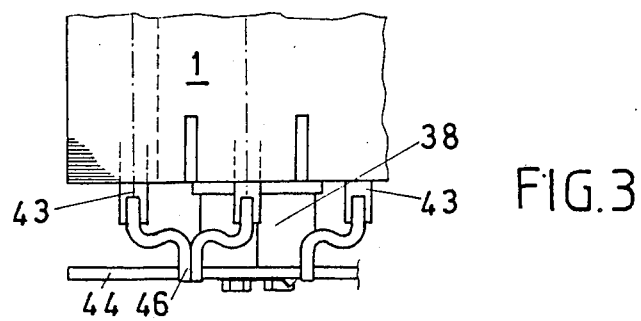
FIG. 3 shows a top view of the pole according to FIG. 1.

Close to the pole surface, damper or short-circuit rods 43 are inserted into axial holes. At the front faces of the elements 26, 27 and projections 38, 39, damper plates 44, 45 are attached in which flexible link pieces 46 are soldered or welded in which, in turn, are soldered to the ends of the damper or short-circuit rods 43 (FIG. 3).

Naturally, more or fewer clamping elements can be provided depending on the width of the pole and the outer shape of the combined clamping and support elements 26, 27 can also be adapted to the respective requirements and local situation without leaving the framework of the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A salient pole of an electric machine, comprising:
   a pole body including a plurality of individual laminations stacked on one another;
   first clamping means, provided in a section of said pole body lying radially inward and including continuous first clamping bolts and nuts, for pressing the individual sheet of the pole body together;
   second clamping means, provided in a section of said pole body lying radially outward for pressing the individual laminations of said pole body together, comprising,
   said pole body including a front side in which are formed blind holes,
   second clamping bolts which extend through the pole body in the blind holes,
   cylindrical sections of combined clamping and support elements placed in said blind holes, said cylindrical sections of combined clamping and supporting elements each having a collar located outside respective of said blind holes and resting on the pole body,
   the combined clamping and support elements further including integrally formed axially running projections, and
   fastening means for fastening said combined clamping and support elements, including screws which act on said second clamping bolts, thereby fastening the pole body assembled from the individual laminations.

2. The salient pole according to claim 1, comprising:
   a damper plate coupled to short-circuit rods by means of associated flexible link pieces, sand damper plate being arranged on said integrally formed axially running projections of said combined clamping and support elements.

* * * * *